Inventors,
Paul B. Horton,
James E. Funk,
Harold C. Hill,
by Sidney Greenberg
Their Attorney

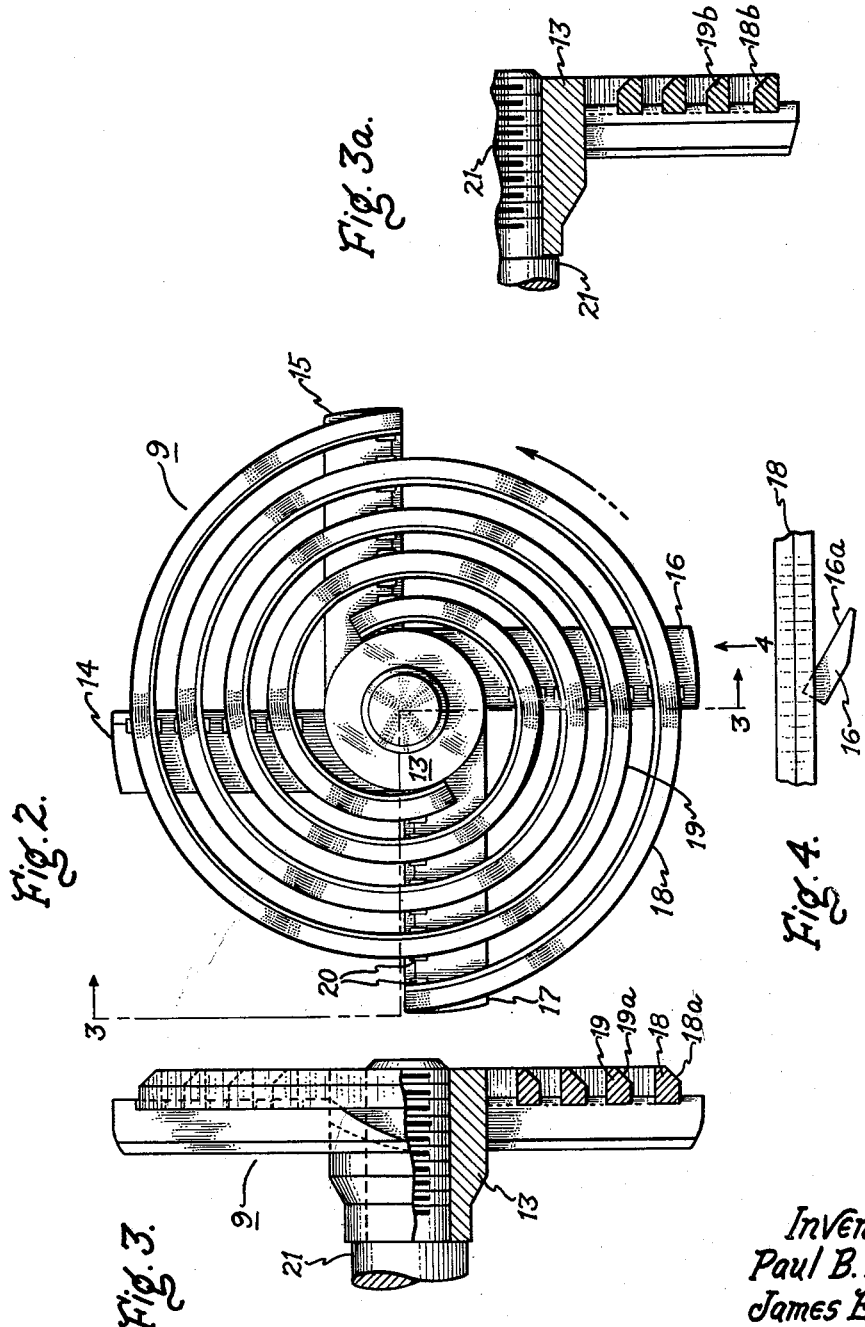

United States Patent Office 3,111,739
Patented Nov. 26, 1963

3,111,739
APPARATUS FOR EXTRUSION OF
PLASTIC MATERIAL
Paul B. Horton and James E. Funk, Baltimore, and Harold C. Hill, Woodbine, Md., assignors to General Electric Company, a corporation of New York
Filed Dec. 9, 1960, Ser. No. 74,857
6 Claims. (Cl. 25—14)

The present invention relates to a method and apparatus for the extrusion of plastic material, and more particularly concerns pug mills for forming porcelain clay blanks used in the manufacture of electrical insulators.

In the use of pug mills commonly employed heretofore for extruding clay blanks, problems are encountered due to the difference in shrinkage of different portions of the ceramic product during drying and firing operations. Evidence has been found that such shrinkage differences are directly related to the orientation of clay particles within the extruded mass. It appears that the extrusion process as commonly carried out, for example, in making clay blanks for manufacture of electrical insulators results in the orientation of the elongated plate-like clay particles which are near the periphery of the pug blank in a direction generally parallel to the direction of flow, while those particles located more centrally in the blank are in general oriented more nearly perpendicular to the flow direction, i.e., transverse to the longitudinal axis of the blank. Experience has shown that shrinkage in drying and in firing will be greatest in a direction perpendicular to the planes of the clay particles and lowest in a direction parallel to these planes. It can be shown that the linear shrinkage in any particular portion across the diameter of an extruded cylinder of a plastic ceramic body, both in the transverse and longitudinal directions, varies according to the distance of the portion from the longitudinal axis of the extrusion. In the case of the longitudinal direction, the closer the particular portion is to the center, the more the shrinkage therein, while in the case of the transverse direction, the reverse is true.

As a result of such differential shrinkage, undesirable stresses are produced during the drying and firing processes which cause excessive losses or lowering of the quality of the ware.

A further difficulty met with in the use of known pug mill apparatus resides in the formation of a laminar structure in the plastic mass due to the action of the extrusion auger, which forms the so-called "auger laminations" in the clay mass as the latter is forced through the pug mill. Such laminar structure tends to weaken the final ceramic product electrically and mechanically. It is desirable, therefore, to provide means for reducing and knitting together such laminations.

It is an object of the invention to provide an improved apparatus for extruding plastic material, and particularly for producing pugs of plastic clay for the manufacture of electrical insulators with improved mechanical and electrical properties.

It is a particular object of the invention to provide an improved pug mill for producing clay pugs from which ceramic products may be made having improved shrinkage characteristics and in particular having reduced shrinkage differentials between different portions of the material.

It is another object of the invention to provide an improved pug mill of the above type which reduce or eliminate laminar structure in the extruded material.

Other objects and advantages will become apparent from the following description and the appended claims.

With the above objects in view, the present invention in one aspect relates to an extrusion apparatus which comprises, in combination, an elongated housing having means therein, such as an auger, for moving a mass of plastic material through the housing, and means associated with the auger for reorienting particles of the plastic material from a direction transverse to the direction of extrusion to a direction generally parallel to the extrusion direction, whereby differences in shrinkage between portions of the extruded plastic material during drying and firing operations are reduced to a minimum.

In a preferred embodiment of the invention, the means for reorienting the plastic material particles comprises a spiral member having spaced turns through which the plastic material is forced in the extrusion process and provides, by virtue of its construction as hereinafter more fully described, proper orientation of the material for reducing the shrinkage differences thereof and also provides substantial reduction of the above-described laminar structure.

The invention will be better understood from the following description taken in conjunction with the accompanying drawings, in which:

FIGURE 2 is a front view of the flow modulator device incorporated in the extrusion apparatus of FIGURE 1;

FIGURE 3 is a partly sectional view of the flow modulator device taken along the line 3—3 of FIGURE 2;

FIGURE 3a is a fragmentary side view of the FIGURE 3 device showing a modification thereof; and FIGURE 4 is a detail view of a portion of the flow modulator device taken in the direction of arrow 4 in FIGURE 2.

Figure 1:
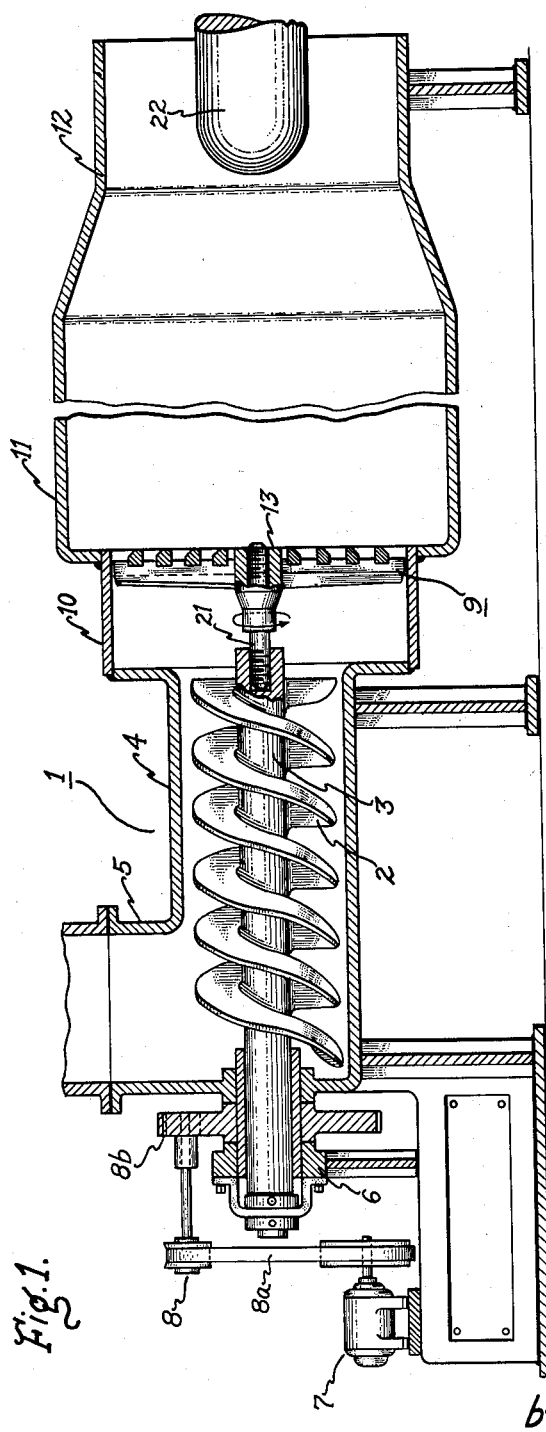
FIGURE 1 is an elevational view, partly in section, showing an extrusion apparatus embodying the present invention.

Referring now to the drawings, and particularly to FIGURE 1, there is shown a pug mill apparatus 1 comprising an extruding auger 2 formed with a shaft 3 for rotation about the axis of the latter in an auger barrel 4. In a usual type of construction, the interior of barrel 4 communicates by means of housing 5 at its rear end with a mixing device (not shown) which conventionally comprises a hopper for receiving the clay to be extruded, a mixing auger, and a vacuum chamber (all not shown) from which the mixed clay is fed into auger barrel 4 for the pug extruding operation. The mixing device forms no part of the present invention, and a typical construction of this component is disclosed in U.S. Patent 2,572,063, Skipper.

Auger shaft 3 is mounted at its rear end for rotation in a bearing 6 and is driven by motor 7 through drive transmission 8, which may comprise a belt 8a and gearing 8b as shown, or any other suitable driving arrangement. At its front end auger shaft 3 is provided with a flow modulator device 9 which has the structure more fully described hereinafter and is suitably secured to auger shaft 3 for rotation therewith about the axis of the latter. Modulator device 9 is enclosed in a housing 10 which forms an extension of auger barrel 4 but is of substantially larger diameter to accommodate modulator device 9. Extrusion chamber 11, which is of still larger diameter, extends forward from housing 10 and at its outer or exit end is formed with a reduced nozzle portion 12 from which the extruded clay is discharged from the pug mill apparatus.

Flow modulator device 9, as shown in FIGURES 2 and 3, comprises a hub 13 to which supporting spoke members 14, 15, 16, and 17 of generally blade-shape are secured at their inner ends and from which each radiates at 90° from the adjacent spoke member. As shown in FIGURE 4, which is a view of spoke member 16 taken in the direction of arrow 4 in FIGURE 2, each spoke member is oriented so that the front (i.e., exit-facing) blade surface 16a is at an angle of about 15–35°, and preferably about 25–30°, to the plane of the spiral modulator device, which as shown, is perpendicular to the axis of auger shaft 3.

Secured by welding or otherwise to the front sides of the radiating spoke members 14, 15, 16, and 17 are a pair of spiral members 18 and 19 arranged interwound with one another with their turns uniformly spaced in the plane of the modulator member, as shown in the front view of FIGURE 2. To facilitate joining spiral members 18 and 19 to the supporting spoke members, the latter are provided with recessed portions 20 in which the spiral members are seated. As seen in FIGURE 3, each spiral member 18, 19 is formed with an outwardly directed surface 18a and 19a extending at an angle of approximately 45° to the plane of the modulator device 9. A connecting shaft 21 removably secures modulator device 9 to the forward end of auger shaft 3.

In the embodiment shown in FIGURE 1, the pug mill apparatus is adapted to form tubular pug blanks by the provision of a mandrel 22, shown in fragmentary form in FIGURE 1, which is inserted axially into nozzle 12 at the discharge end of the extrusion apparatus. Where such a centrally arranged mandrel is employed for producing tubular products, the angled front surfaces 18a, 19a of the spiral members 18, 19 are directed away from the axis of the modulator device 9 as shown in FIGURE 1 for the purpose of directing the flow of the material in optimum manner around the mandrel 22. However, in those cases where a solid cylindrical pug is desired, the mandrel 22 is omitted, and the modulator spiral members 18, 19 are preferably provided with angled surfaces 18b, 19b directed inwardly toward the modulator axis as shown in the embodiment of FIGURE 3a, instead of outwardly away from the axis as shown in the embodiment of FIGURE 3.

In the operation of the device described, the mixed plastic clay mass is introduced through housing 5 into the entrance end of auger barrel 4 through which it is forced by extruding auger 2. Auger 2 together with flow modulator device 9 secured thereto rotate in a counter-clockwise direction as viewed from the front, as shown by the directional arrows in FIGURES 1 and 2. The clay mass is driven as a result through modulator device 9 as the latter rotates and into extrusion chamber 11. The angled blade faces of spoke members 14, 15, 16, 17 as they rotate contribute to forcing of the plastic mass through the openings in spiral unit 9 in a direction along the axis of rotation. As the mass passes through spiral unit 9, the angled front faces of spiral members 18, 19 contribute to directing the flow toward or away from the axis depending on their orientation as described above. From extrusion chamber 11, the clay mass passes through nozzle 12 around mandrel 22 where it discharges from the apparatus in the form of a compacted tubular mass. This extruded material is then cut into desired lengths forming pug blanks which are then further shaped, dried and fired in accordance with procedures well known in the art. The structure of mandrel 22 shown only in fragmentary form is of conventional type, and a known construction thereof is shown, for example, in U.S. Patent No. 2,425,270.

As discussed above, non-uniform grain orientation of the clay particles within the plastic mass is believed to be the primary cause of shrinkage differences across segments of an extruded ceramic piece. Orientation of elongated or flat plate-like particles such as those of clay in a plastic mass are caused by pressure and laminar flow, such as occurs in conventional auger type pug mills. A mass of such particles under a compressive force will tend to be oriented in planes perpendicular to the direction of applied force. Under the influence of a tensile force the particles will tend to orient in planes parallel to the direction of the applied force. Under shearing action, such as occurs in laminar flow, the grains will tend to orient with their major axis parallel to the plane of shear. Within a plug mill barrel when the plastic body leaves the last auger flight, shearing action with viscous flow plus pressure in the direction of the longitudinal axis of extrusion causes considerable orientation of the grains perpendicular to the direction of extrusion. Material which is next to areas that were adjacent to auger blades would normally have extreme orientation in this direction. Flow of the plastic mass with its shearing action would account for modifications in the orientation pattern as the mass moves through the extrusion barrel after leaving the auger in a conventional type of pug mill. It is for the above reasons that shrinkage differences occur in extruded shapes formed from extrusion mills commonly used in the ceramic industry, and such shrinkage differences lead to stresses in the dried and fired blanks which may cause rupture or cracking therein. The formation of auger laminations as described previously is also a factor in the undesirable orientation of segments of the mass that were adjacent to the auger blades. In order to provide compact and knit the plastic laminations as they are produced from the extruding auger, it is necessary to employ pressure and shearing action on the material. Normally the plastic material laminations are not adequately compacted or knitted together under the pressures and other conditions existing in conventional extrusion mills.

As will be seen from the construction and arrangement of the flow modulator device 9 of the present invention, the column of plastic clay material coming off auger 2 must pass through the narrow openings between the spaced turns of the spiral members 18, 19 as the modulator device 9 rotates. In being restricted by and passing around the spiral members 18, 19 and through the openings between the turns thereof, the plastic mass is sheared throughout its cross-section in the direction of the axis of extrusion. This action causes reorientation of a large percentage of particles in the mass being extruded. The major orientation from this action will be in a direction parallel to and generally circumferential about the center line of the extrusion. An additional shearing action is produced by the slow continual movement of the rotating spiral members in relation to a fixed diameter of the piece being extruded. Thus, there is an additional component of shear that aids in consolidation of the mass after passing through spiral unit 9. These two shear actions modify the orientation pattern produced by auger 2, which is essentially perpendicular to the axis of extrusion, to one in which the major axes of the oriented particles are generally parallel or at a slight angle to the axis of extrusion and, in addition, generally circumferential about the axis of extrusion. As this material flows through the barrel and the spiral unit, the flow action has but little additional orienting effect on the mass because the orienting influences across the section of the extrusion are in directions not greatly different from the oriented grains.

As a result of such modulation of the flow by the described apparatus, the shrinkage differences in the blanks produced are reduced in any one direction of the extrusion. Shrinkage measurements were taken on extruded tubes made with apparatus of the type described with the spiral modulator installed and without the modulator, the tubes being of a typical electrical porcelain composition comprising approximately 49% by weight of clay, 31% feldspar and 20% flint. The results obtained are shown in the table below:

*Table I.—Comparison of Linear Shrinkage Differences Across Walls of Tubes Made Without and With a Flow Modulator*

| Sample No. | Without Modulator—Percent Linear Shrinkage | | | With Modulator—Percent Linear Shrinkage | | |
|---|---|---|---|---|---|---|
| | Drying | Firing | Total | Drying | Firing | Total |
| 1 | 5.9 | 7.1 | 13.0 | 5.7 | 7.5 | 13.2 |
| 2 | 6.6 | 7.6 | 14.2 | 5.9 | 7.0 | 12.9 |
| 3 | 7.2 | 8.7 | 15.9 | 5.9 | 7.3 | 13.2 |
| 4 | 7.9 | 10.1 | 18.0 | 5.5 | 7.2 | 12.7 |
| 5 | 6.9 | 8.5 | 15.4 | 5.9 | 7.8 | 13.7 |
| 6 | 5.6 | 7.5 | 13.1 | 6.0 | 7.7 | 13.7 |
| Maximum difference | | | 5.0 | | | 1.0 |
| Average linear shrinkage | | | 14.9 | | | 13.2 |

The data given for samples 1–6 as listed in the table above correspond from top to bottom to increments of measurements across the wall of the tube from the outside surface to the inside surface.

As will be seen, the extrusion produced with the modulator installed had only one-fifth the maximum difference between different parts of the sample as compared to an extruded piece formed by the same apparatus without the modulator. In all cases of similar extrusions that were tested, those with the modulator installed showed a marked improvement in the linear shrinkage differences. The modulator device has proven to be of particular practical benefit in the extrusion of large diameter porcelain tubes that are dried, and then finished on a lathe to desired shape before glazing and firing.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. Extrusion apparatus comprising, in combination, an elongated housing having an entrance and an exit, an extruding auger within said housing rotatable about the longitudinal axis thereof for extruding plastic material received at the entrance toward the exit for discharge therefrom, means associated with said auger for modulating the flow of plastic material leaving said auger, said means comprising a spiral member having turns spaced from each other in a plane transverse the longitudinal axis of said housing, said spiral member being rotatable in a constant direction with said auger for forcing said plastic material through said spiral member and said housing, and means for rotating said auger and said spiral member in said direction.

2. Extrusion apparatus comprising, in combination, an elongated housing having an entrance and an exit, an extruding auger within said housing rotatable about the longitudinal axis thereof for extruding plastic material received at the entrance toward the exit for discharge therefrom, means asosciated with said auger for modulating the flow of plastic material leaving said auger, said means comprising a spiral member rotatable in a constant direction with said auger and having turns spaced from each other in a plane transverse the longitudinal axis of said housing, said spiral member having a flat surface on the exit side thereof oriented at an angle to said plane, and means for rotating said auger and said spiral member in said direction.

3. The extrusion apparatus as defined in claim 2, wherein a mandrel is arranged axially within said housing at its exit, and said angled surface of said spiral member faces away from said longitudinal axis.

4. The extrusion apparatus as defined in claim 2, wherein said angled surface of said spiral member faces toward said longitudinal axis.

5. Extrusion apparatus comprising in combination, an elongated housing having an entrance end and an exit end, an extruding auger within said housing at its entrance end and rotatable about the longitudinal axis thereof for extruding plastic material from the entrance toward the exit end, and means associated with said auger intermediate said housing ends for modulating the flow of plastic material leaving said auger, said means comprising support means extending transverse said axis and attached to said auger for rotation therewith, and at least one spiral member mounted on said support means for rotation therewith, said spiral member having turns spaced from each other in a plane transverse the longitudinal axis of said housing and having a flat surface on the exit side thereof oriented at an angle to said plane, said support means having a flat surface on the exit side thereof extending at an angle to said plane, said flow modulating means being rotatable in a constant direction with said auger for forcing the plastic material between the turns of said spiral member and through said housing, and means for rotating said auger and said flow modulating means in said direction.

6. Extrusion apparatus comprising, in combination, an elongated housing having an entrance end and an exit end, an extruding auger within said housing at its entrance end and rotatable about the longitudinal axis thereof for extruding plastic material from the entrance toward the exit end, and means associated with said auger intermediate said housing ends for modulating the flow of plastic material leaving said auger, said means comprising a hub secured to said auger, a plurality of members extending radially from said hub, and at least one spiral member mounted on said radial members for rotation therewith, said spiral member having turns spaced from each other in a plane tranverse the longitudinal axis of said housing and having a flat surface on the exit side thereof oriented at an angle of about 45° to said plane, said radially extending members having a surface on the exit side thereof oriented at an angle of about 15–35° to said plane, said flow modulating means being rotatable in a constant direction with said auger for forcing said plastic material through said spiral member and said housing, and means for rotating said auger and said flow modulating means in said direction.

References Cited in the file of this patent

UNITED STATES PATENTS

| 2,940,126 | Sheridan | June 14, 1960 |
| 3,002,227 | Bruckner | Oct. 3, 1961 |

FOREIGN PATENTS

| 1,061,247 | Germany | July 9, 1959 |
| 363,740 | France | Aug. 7, 1906 |